US007740491B2

(12) United States Patent
Murayama

(10) Patent No.: US 7,740,491 B2
(45) Date of Patent: Jun. 22, 2010

(54) CARD CONNECTOR

(75) Inventor: Takeshi Murayama, Miyagi-ken (JP)

(73) Assignee: Alps Electric Co., Ltd., Tokyo (JP)

( * ) Notice: Subject to any disclaimer, the term of this patent is extended or adjusted under 35 U.S.C. 154(b) by 0 days.

(21) Appl. No.: 12/425,213

(22) Filed: Apr. 16, 2009

(65) Prior Publication Data
US 2009/0275221 A1    Nov. 5, 2009

(30) Foreign Application Priority Data
May 2, 2008    (JP)    ............................. 2008-120428

(51) Int. Cl.
H01R 13/648    (2006.01)
(52) U.S. Cl. .................... 439/108; 439/95; 439/181; 439/637
(58) Field of Classification Search .................. 439/64, 439/74, 79, 95, 101, 108, 152, 159, 160, 439/181, 629, 630, 637
See application file for complete search history.

(56) References Cited

U.S. PATENT DOCUMENTS

| | | | | |
|---|---|---|---|---|
| 6,379,163 | B1 * | 4/2002 | Yu | ............................... 439/95 |
| 2009/0197453 | A1 * | 8/2009 | Murayama et al. | ........... 439/326 |
| 2009/0263995 | A1 * | 10/2009 | Murayama et al. | ........... 439/152 |
| 2009/0275221 | A1 * | 11/2009 | Murayama | .................... 439/74 |

FOREIGN PATENT DOCUMENTS

| | | |
|---|---|---|
| JP | 2003-123909 | 4/2003 |
| JP | 2006-147281 | 6/2006 |

* cited by examiner

Primary Examiner—James Harvey
(74) Attorney, Agent, or Firm—Beyer Law Group LLP

(57) ABSTRACT

A card connector includes a housing which allows a card to inserted thereinto, and a plurality of terminal members which is arranged in the housing, and is respectively connectable to a plurality of external connections provided on the bottom face of the card. The plurality of terminal members is composed of first terminal members which are arranged on an inner bottom face of the housing, are provided side to side along an insertion direction of the card, and are connectable to first external connections of the plurality of external connections of the card which are provided on the side of a rear end of the card, and second terminal members which are connectable to second external connections of the plurality of external connections of the card which are provided on the side of a front end of the card. The card connector also includes a driving member which is able to displace the first terminal members which are provided on the inner bottom face of the housing, and located nearer to an insertion slot of the card when the card is inserted in a direction apart from the second external connections of the card. The driving member is provided with a grounding portion which is located nearer to the insertion slot of the card than the first terminal members.

6 Claims, 8 Drawing Sheets

CARD CONNECTOR

CROSS REFERENCE TO RELATED APPLICATIONS

The present application contains subject matter related to and claims priority to Japanese Patent Application JP2008-120428 filed in the Japanese Patent Office on May 2, 2008, the entire contents of which are incorporated herein by reference.

BACKGROUND

1. Technical Field

The present invention relates to a card connector including first terminal members which can be connected to first external connections of a card to be inserted, and are arranged on the side of an insertion slot, and second terminal members which are connectable to second external connections of the card and are arranged on the deep side of an apparatus.

2. Related Art

As this type of related-art technique, there is one shown in Japanese Unexamined Patent Application Publication No. 2006-147281. This related-art technique includes a housing which allows a card having notches on the bottom side thereof to be inserted thereinto, and a plurality of terminal members which is arranged in the housing, and is respectively connectable to a plurality of external connections provided on the bottom face of the card. The plurality of terminal members is composed of first terminal members which are arranged on an inner bottom face of the housing, are provided side to side along an insertion direction of the card, and are connectable to first external connections of the plurality of external connections of the card which are provided on the side of a rear end of the card, and second terminal members which are connectable to second external connections of the plurality of external connections of the card which are provided on the side of a front end of the card. Additionally, the related-art technique also includes a driving member, which is able to displace the first terminal members which are provided on the inner bottom face of the housing, and located nearer to an insertion slot of the card when the card is inserted, so as not to contact the second external connections of the card. This driving member is provided with engaging protrusions which protrude into an insertion path of the card and can be fitted into the aforementioned notches.

In the related-art technique configured in this way, at the time of insertion of the card, the driving member is pressed via the engaging protrusions which abut on the bottom face of the card, and thereby, the driving member depresses the first terminal members to a non-contact position separated from the bottom face of the card so that the first terminal members do not contact the second external connections of the card. Additionally, the second external connections of the card is connected to the second terminal members, in a card insertion completion position, i.e., a predetermined mounting position, and the engaging protrusions of the driving member are fitted into the notches of the card to release the pressing force to the driving member, whereby the first terminal members move up from the aforementioned non-contact position, and are connected to the first external connections of the card.

In the aforementioned related-art technique, the first terminal members located on the upstream side in the insertion direction of the card are configured to have contacts which contact the first external connections of the card in a position near the insertion slot of the card. For this reason, when the card is charged with unnecessary static electricity or the like when the card is inserted, discharge to the contacts of the first terminal members may occur. When discharge to the contacts of such first terminal members occurs, there is a possibility that the first terminal members or electrical components electrically connected to the first terminal members may be damaged.

SUMMARY

It is desirable to provide a card connector which can prevent discharge to first terminal members from a card, even if the card is charged with unnecessary static electricity or the like when the card is inserted.

The card connector according to an embodiment of the invention is a card connector including a housing which allows a card to inserted thereinto, and a plurality of terminal members which is arranged in the housing, and is respectively connectable to a plurality of external connections provided on the bottom face of the card. The plurality of terminal members is composed of first terminal members which are arranged on an inner bottom face of the housing, are provided side to side along an insertion direction of the card, and are connectable to first external connections of the plurality of external connections of the card which are provided on the side of a rear end of the card, and second terminal members which are connectable to second external connections of the plurality of external connections of the card which are provided on the side of a front end of the card. The card connector also includes a driving member which is able to displace the first terminal members which are provided on the inner bottom face of the housing, and located nearer to an insertion slot of the card when the card is inserted in a direction apart from the second external connections of the card. The driving member is provided with a grounding portion which is located nearer to the insertion slot of the card than the first terminal members.

In the invention configured in this way, in a case where a card is charged unnecessarily when the card is inserted, this card contact the grounding portion of the driving member before it contacts the first terminal member, whereby the card is discharged via this grounding portion. That is, even if the card is charged with unnecessary static electricity or the like when the card is inserted, discharge to the first terminal members can be prevented. This makes it possible to reliably prevent damage of the first terminal members accompanying charging of an inserted card.

Additionally, the card connector according to the embodiment of the invention further includes biasing members which biases the driving member in a direction in which the driving member abuts on the card. The biasing members and the grounding portion are electrically connected together. In the invention configured in this way, a path which makes the grounding portion grounded to the biasing members can be shared, and the number of parts can be reduced.

Additionally, in the card connector according to the embodiment of the invention, preferably, the biasing members and the grounding terminals of the first terminal members are electrically connected together. In the invention configured in this way, the grounding portion and the grounding terminals of the first terminal members can be electrically connected together via the biasing members, and discharge paths can be basically simplified into one path.

Additionally, in the card adapter according to the embodiment of the invention, preferably, a grounding external connection which is connectable to the grounding portion is provided on the bottom face of the card. In the invention configured in this way, when the card is inserted, the card is grounded via the grounding external connection. Thus, the electric potential of an electric circuit in the card can be stabilized.

In the card connector according to the embodiment of the invention, the driving member which depresses the first terminal members so that the first terminal members do not contact the second external connections of the card when the card is inserted is provided with a grounding portion which is located nearer to the insertion slot of the card than the first terminal members. Thus, even if the card is charged with unnecessary static electricity or the like when the card is inserted, the card contacts the grounding portion of the driving member and discharge electricity. Thus, discharge to the first terminal members can be prevented. Thereby, the first terminal members or electrical components connected to the first terminal members can be reliably prevented from being damaged due to charging of the card which has been concerned in the related art, and a highly reliable card connector can be realized compared with those in the related art.

BRIEF DESCRIPTION OF THE DRAWINGS

FIG. 1A is a plan view, and FIG. 1B is a perspective view showing the bottom side.

FIG. 4A is a perspective view, and FIG. 4B is a side view.

FIG. 7A is a plan view, and FIG. 7B is a plan view when the card is removed from FIG. 7A.

FIG. 8A is a plan view, and FIG. 8B is a plan view when the card is removed from FIG. 8A.

FIG. 9A is a plan view, and FIG. 9B is a plan view when the card is removed from FIG. 9A.

DESCRIPTION OF EXEMPLARY EMBODIMENTS

Hereinafter, best modes for carrying out a card connector according to an embodiment of the invention will be described with reference to the accompanying drawings.

Card Used for this Embodiment

Figure 1A:
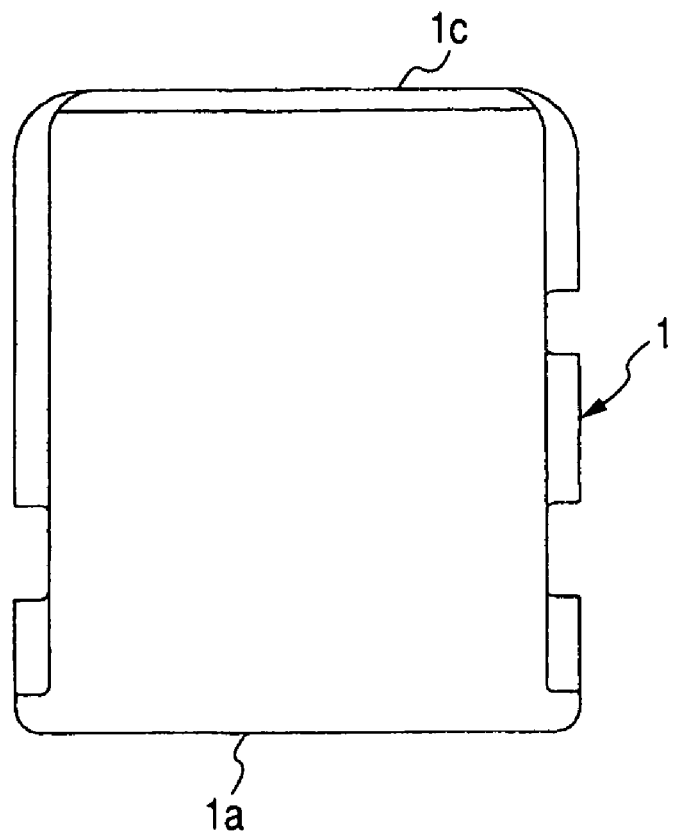
FIGS. 1A and 1B are views showing a card used for a card connector according to one embodiment of the invention.
Figure 1B:
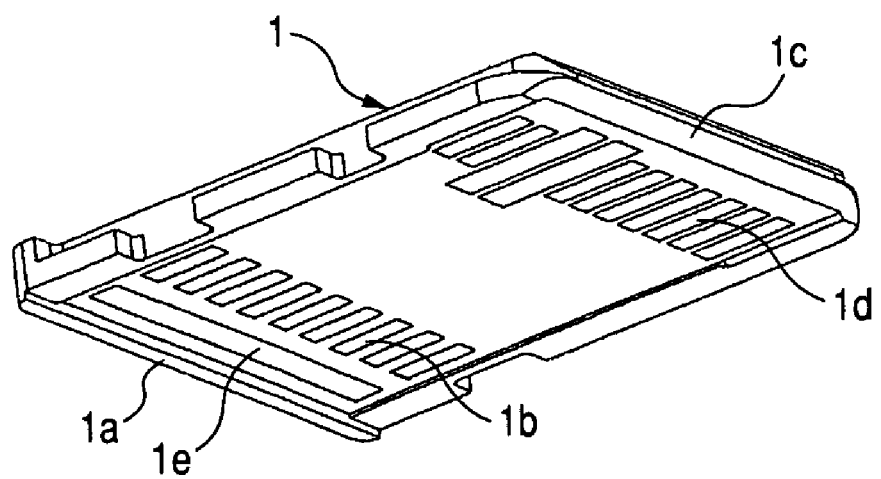

FIGS. 1A and 1B are views showing a card used for a card connector according to one embodiment of the invention, FIG. 1A is a plan view, and FIG. 1B is a perspective view showing the bottom side.

As shown in FIGS. 1A and 1B, on the bottom face of the card 1 used for this embodiment, first external connections 1b are provided on the side of a rear end 1a gripped at the time of insertion of a card 1 into the card connector according to this embodiment, and extraction of the card 1 from the card connector according to this embodiment, second external connections 1d are provided on the side of a front end 1c, and a grounding external connection 1e is provided between the first external connections 1b and the rear end 1a. In addition, although illustration is omitted, the bottom face of the card 1 is provided with notches equivalent to the aforementioned related-art technique.

Card Connector According to this Embodiment

Figure 2:
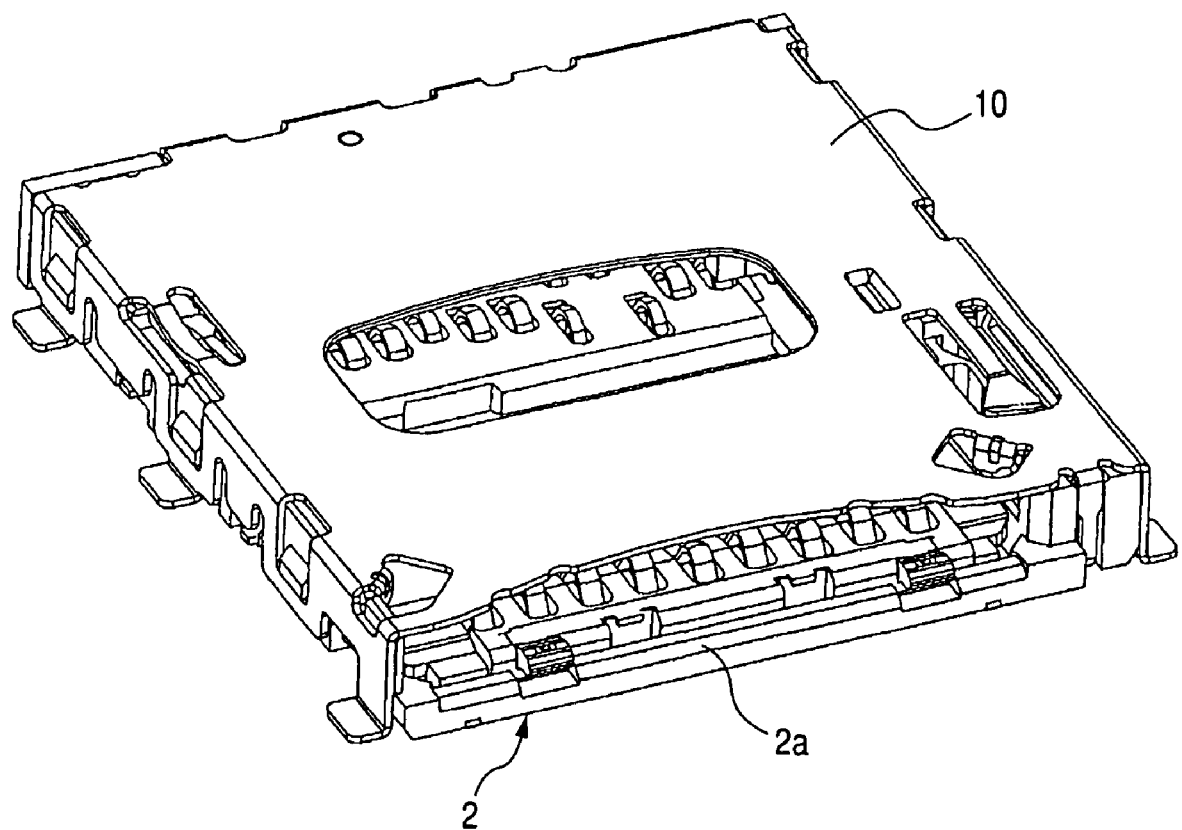
FIG. 2 is a perspective view showing the card connector according to one embodiment of the invention.
Figure 3:
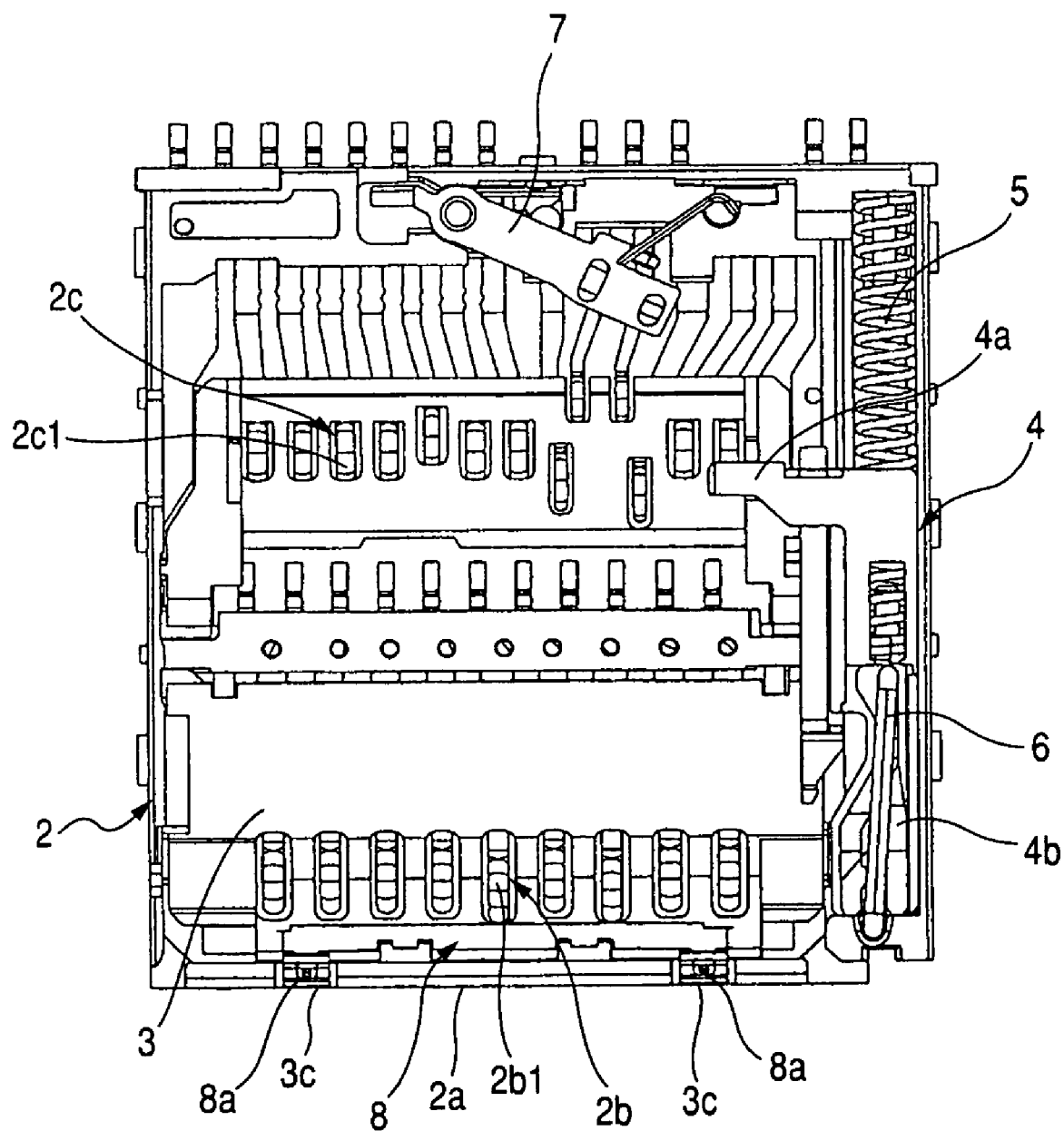
FIG. 3 is a plan view showing a state in which a cover member is excluded in this embodiment.
Figure 4A:
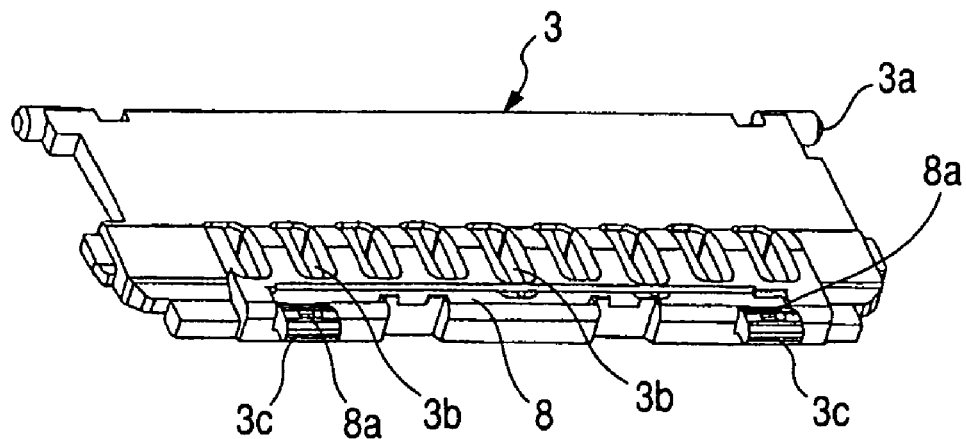
FIGS. 4A and 4B are views showing a driving member provided in this embodiment.
Figure 4B:
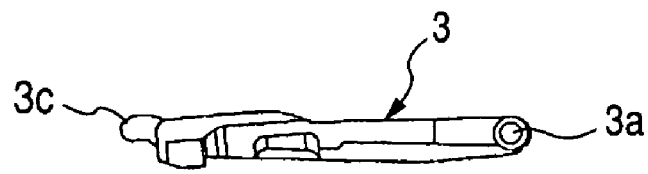
Figure 5:
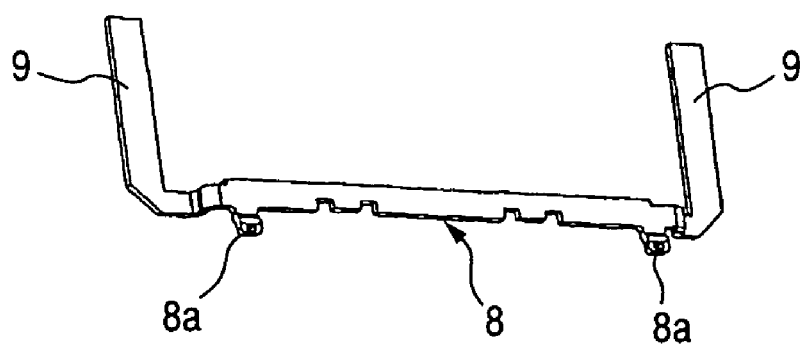
FIG. 5 is a perspective view showing a grounding portion and biasing members which are provided in this embodiment.
Figure 6:
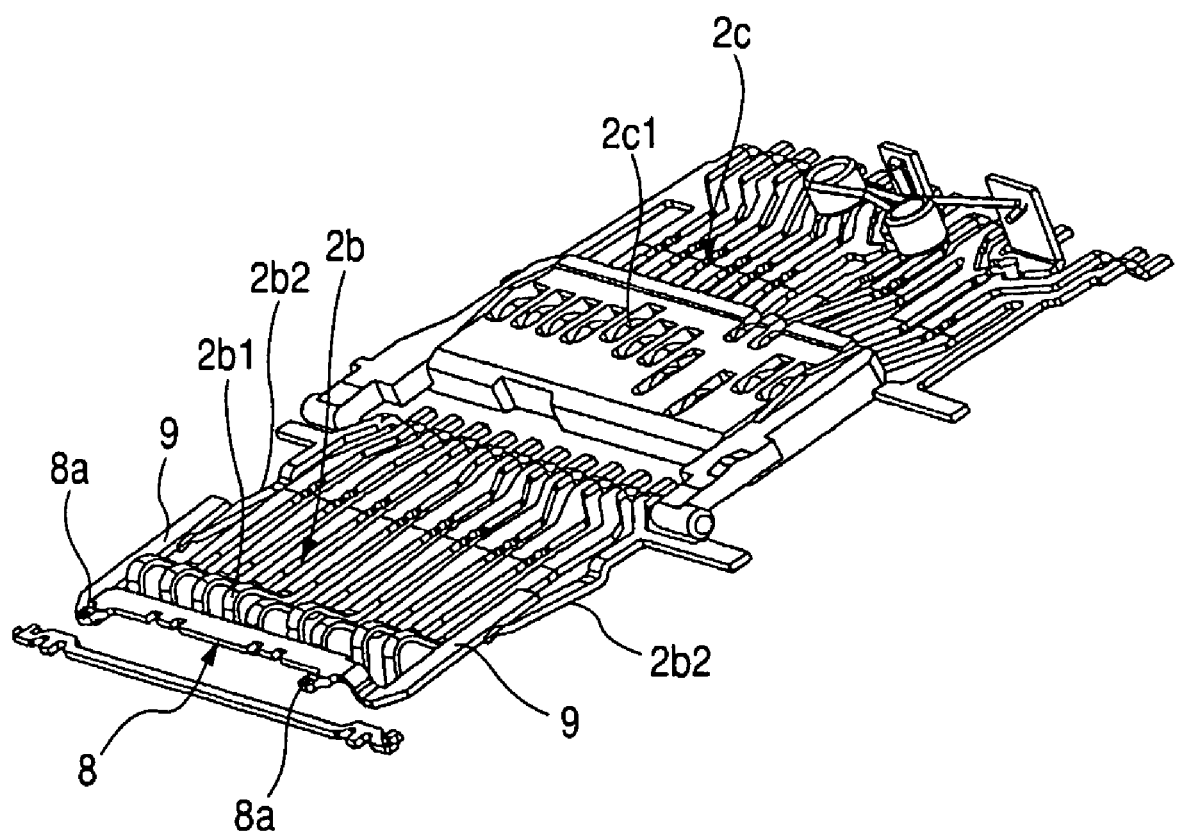
FIG. 6 is a perspective view showing the arrangement relationship between the biasing members provided in this embodiment, and grounding terminals included in a first terminal member.

FIG. 2 is a perspective view showing the card connector according to one embodiment of the invention, FIG. 3 is a plan view showing a state in which a cover member is excluded in this embodiment, FIGS. 4A and 4B are views showing a driving member provided in this embodiment, FIG. 4A is a perspective view, and FIG. 4B is a side view, FIG. 5 is a perspective view showing a grounding portion and biasing members which are provided in this embodiment, and FIG. 6 is a perspective view showing the arrangement relationship between the biasing members provided in this embodiment, and grounding terminals included in a first terminal member.

The card connector according to this embodiment, as shown in FIG. 2, includes a housing 2 into which the card 1 shown in FIG. 1 is inserted, and a cover member 10 which covers the housing 2. An opening on the near side becomes an insertion slot 2a of the card 1.

On the inner bottom face of the housing 2, as shown in FIG. 3, a plurality of first terminal members 2b which has contacts 2b1 which can contact the first external connections 1b of the card 1 are arranged on the side of the insertion slot 2a, and a plurality of second terminal members 2c which has contacts 2c1 which can contact the second external connections 1d of the card 1 are arranged in a deep-side position of an apparatus. That is, the first terminal members 2b and the second terminal members 2c are provided side by side along the insertion direction of the card 1.

Additionally, a driving member 3 which can displace the first terminal members 2b located nearer to the insertion slot 2a of the card 1 is arranged on the inner bottom face of the housing 2. In addition, although illustration is omitted, engaging protrusions which are swollen into the insertion path of the card 1, are able to engage the aforementioned notches (not shown) of the card 1, and are equivalent to the aforementioned related-art technique are provided on a top face of the driving member 3.

By making the bottom face of the card 1 abut on the engaging protrusions (not shown) of the driving member 3 and pressing the driving member 3 at the time of insertion of the card 1, the driving member 3 depresses the first terminal members 2b to a non-contact position separated from the bottom face of the card 1, and fit the engaging protrusions (not shown) of the driving member 3 into the notches (not shown) of the card 1, thereby releasing the pressing force to the driving member 3, in an insertion completion position, i.e., a predetermined mounting position, of the card 1. Thereby, the first terminal members 2b rise from the non-contact position, and the contacts 2b1 of the first terminal members 2b contact the first external connections 1b of the bottom face of the card 1 in via the driving member 3.

Additionally, this embodiment includes a slider 4 having an engaging portion 4a which engages the front end 1c of the card 1, and a coil spring 5 which biases the slider 4 in the direction of the insertion slot 2a. For example, the slider 4 is formed with a heart cam 4b, and a slide member 6 which has a pin engaging a heart cam 4b at its lower portion is rockably provided in the housing 2. Additionally, an ejection lever 7 which is rotatable within a plane, is biased in the direction of the insertion slot 2a, is able to engage the front end 1c of the card 1 inserted into the housing 2, thereby giving the force of ejecting the card 1 to the card 1 is provided in a deep-side position of the apparatus.

The above-described driving member 3, as shown also in FIG. 4, has a shaft 3a which forms a rotation pivot, and a plurality of windows 3b through which contacts 2b1 of the first terminal members 2b can protrude. Additionally, a grounding portion 8 which is located nearer to the insertion slot 2a than the first terminal members 2b and is formed from a conductive metal plate is integrally provided in the driving member 3, for example, by insert molding. As shown in FIG. 5, the grounding portion 8 has a pair of projections 8a which can contact the grounding external connection 1e of the aforementioned card 1. The projections 8a are arranged in projecting portions 3c of the driving member 3.

Additionally, as shown in FIG. 5, biasing members 9 which have the resilient force which biases the driving member 3 upward integrally with the grounding portion 8 and are formed from a conductive metal plate are provided on both side portions of the grounding portion 8. That is, the biasing members 9 and the grounding portion 8 are electrically connected together.

Additionally, as shown in FIG. 6, the biasing members 9 and grounding terminals 2b2 of the first terminal members 2b are brought into contact with each other and are electrically connected.

Card Insertion Operation to this Embodiment

Figure 7A:
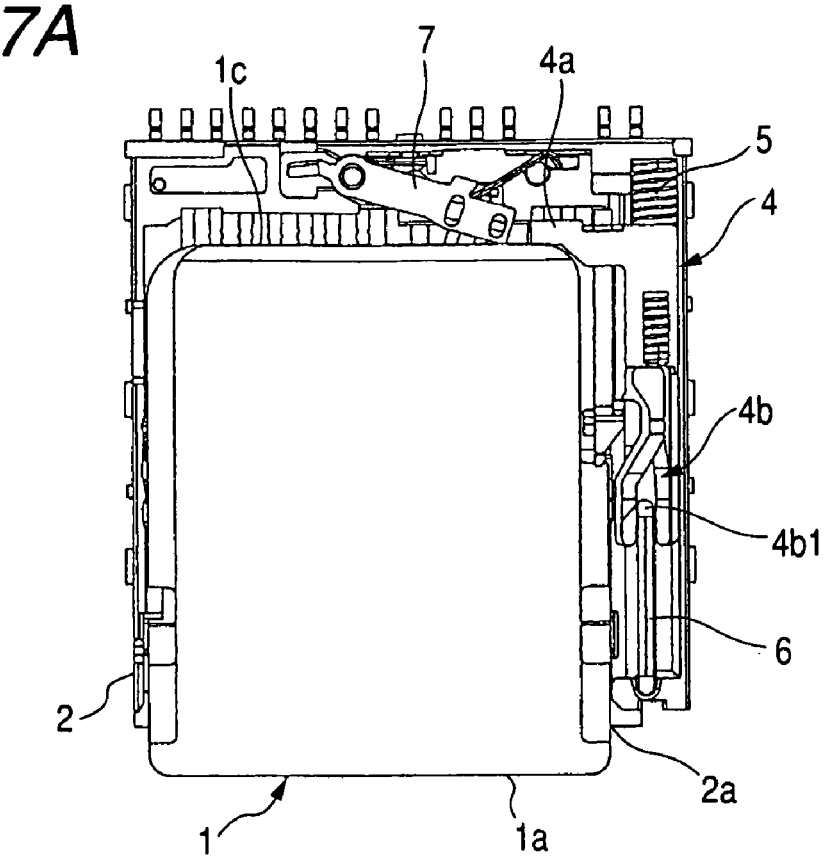
FIGS. 7A and 7B are views showing the state of this embodiment when a card is mounted in a predetermined mounting position.
Figure 7B:
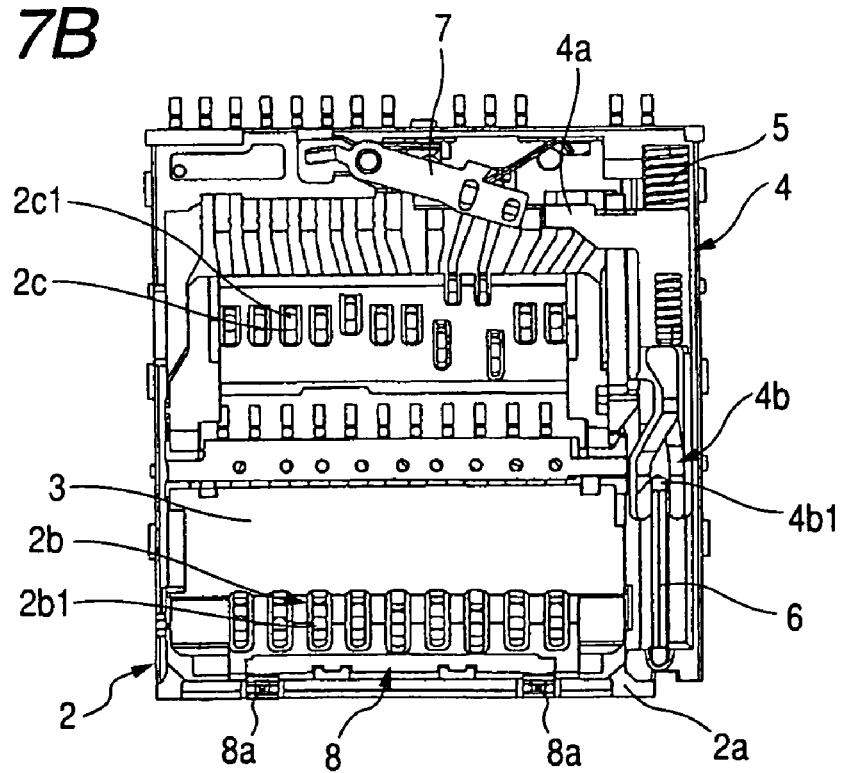

FIGS. 7A and 7B are views showing the state of this embodiment when a card is mounted in a predetermined mounting position, FIG. 7A is a plan view, and FIG. 7B is a plan view when the card is removed from FIG. 7A.

When the card 1 is inserted into the housing 2 from the insertion slot 2a of the card connector according to this embodiment with the rear end 1a of the card 1 gripped, the front end 1c of the card 1 engages the engaging portion 4a of the slider 4 is engaged, and with push-in of the card 1, the slider 4 slides toward the deep side of the apparatus against the force of the coil spring 5. Additionally, the front end 1c of the card 1 engages the ejection lever 7, and the ejection lever 7 is rotated counterclockwise against the force of the spring. With the sliding of the aforementioned slider 4, the pin of the slide member 6 slides relatively on the heart cam 4b provided in the slider 4. In the insertion completion position, the pin of the slide member 6 is locked to a locking portion 4b1 of the heart cam 4b, and as shown in FIG. 7A, the card 1 is mounted and locked in a predetermined mounting position.

When the card 1 is inserted into the housing 2 as mentioned above and the card 1 is needlessly charged with static electricity or the like, the card 1 contacts the grounding portion 8 of the driving member 3, whereby discharge is made via the grounding portion 8, the biasing members 9, and the grounding terminals 2b2 of the first terminal members 2b.

Thereafter, the bottom face of the card 1 abuts on the engaging protrusions (not shown) of the driving member 3 as mentioned above, whereby the driving member 3 rotates downward about the shaft 3a against the resilient force of the biasing members 9, and the first terminal members 2b are depressed by the driving member 3 so as not to contact the second external connections 1d of the card 1. Then, when the card reaches the vicinity of the predetermined mounting position shown in FIG. 7, the second external connections 1d of the bottom face of the card 1 are connected to the second terminal members 2c of the housing 2. Along with this, the engaging protrusions (not shown) of the driving member 3 engage the notches (not shown) formed in the bottom face of the card 1, and the driving member 3 rotates upward by the resilient force of the biasing members 9. Thereby, the contacts 2b1 of the first terminal members 2b protrude from the windows 3b of the driving member 3, and contact the first external connections 1b of the bottom face of the card 1, whereby the first terminal members 2b and the first external connections 1b of the card 1 are connected together.

Additionally, the grounding external connection 1e formed on the bottom face of the card 1 contact the pair of projections 8a of the grounding portion 8. Accordingly, even if the card 1 is charged, discharge is made via the grounding external connection 1e of the card 1 and the projections 8a of the grounding portion 8, and via the biasing members 9 connected to the grounding portion 8, and the grounding terminals 2b2 of the first terminal members 2b which contacts the biasing members 9.

As shown in FIG. 7, with the card 1 held in a predetermined mounting position, the transmission and reception of a signal to/from the card 1 become possible by the connection between the first terminal members 2b and the first external connections 1b of the card 1 and the connection between the second terminal members 2d and the second external connections 1d of the card 1.

Card Ejection Operation from this Embodiment

Figure 8A:
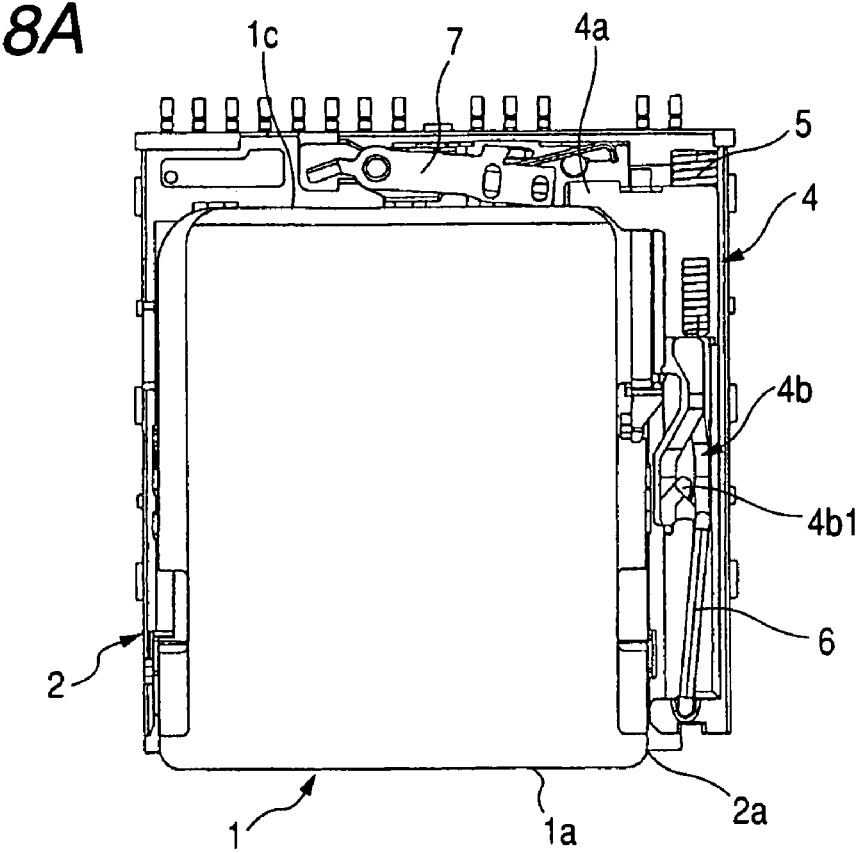
FIGS. 8A and 8B are views showing the state of this embodiment when a card is over-stroked during ejection.
Figure 8B:
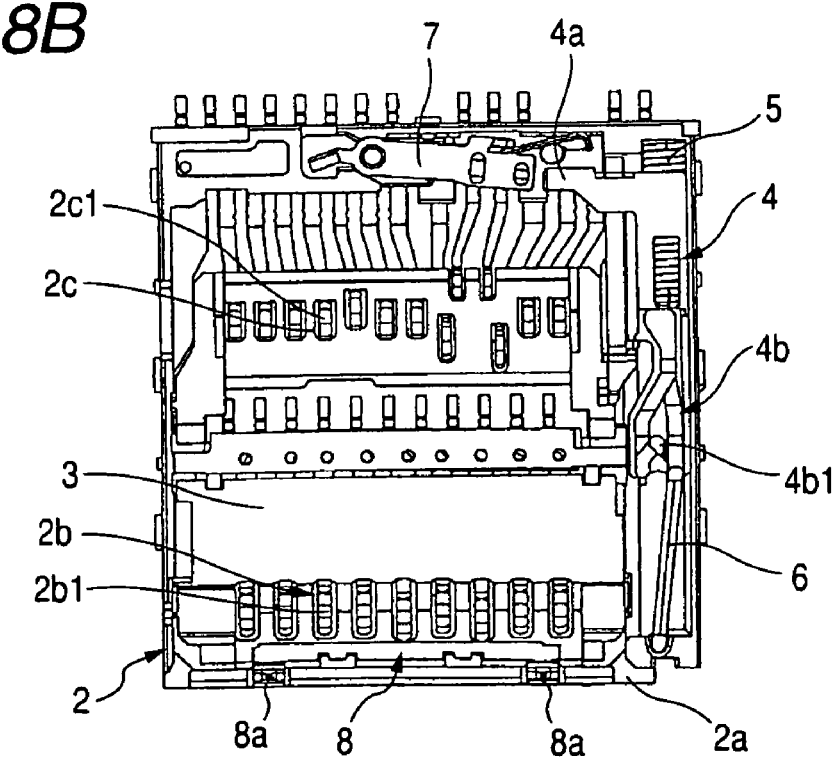
Figure 9A:
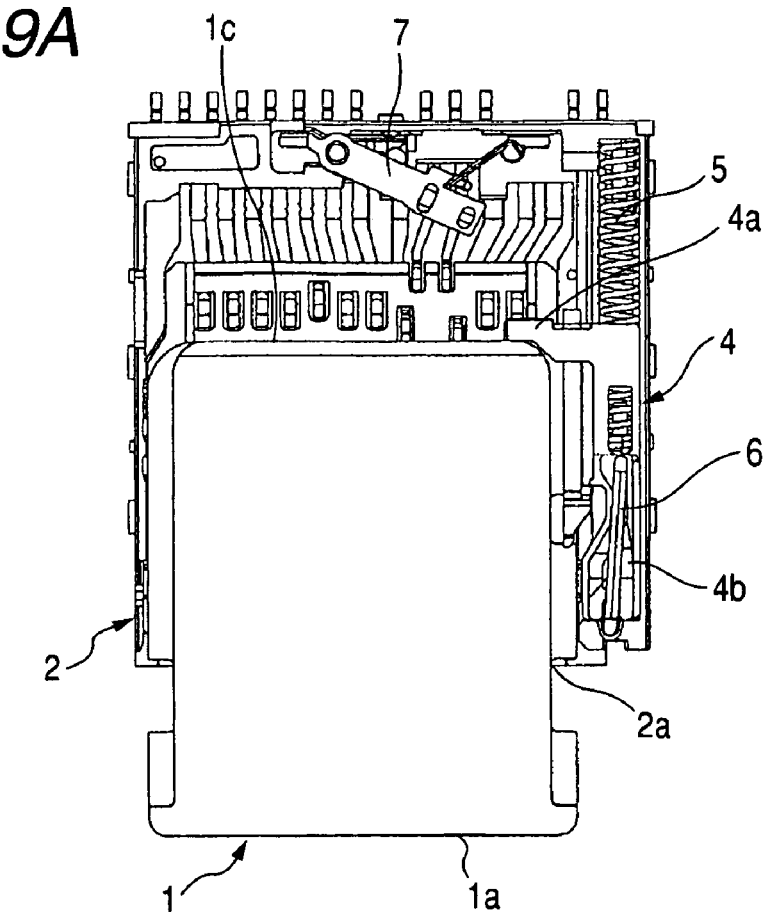
FIGS. 9A and 9B are views showing the state of this embodiment when a card is ejected.
Figure 9B:
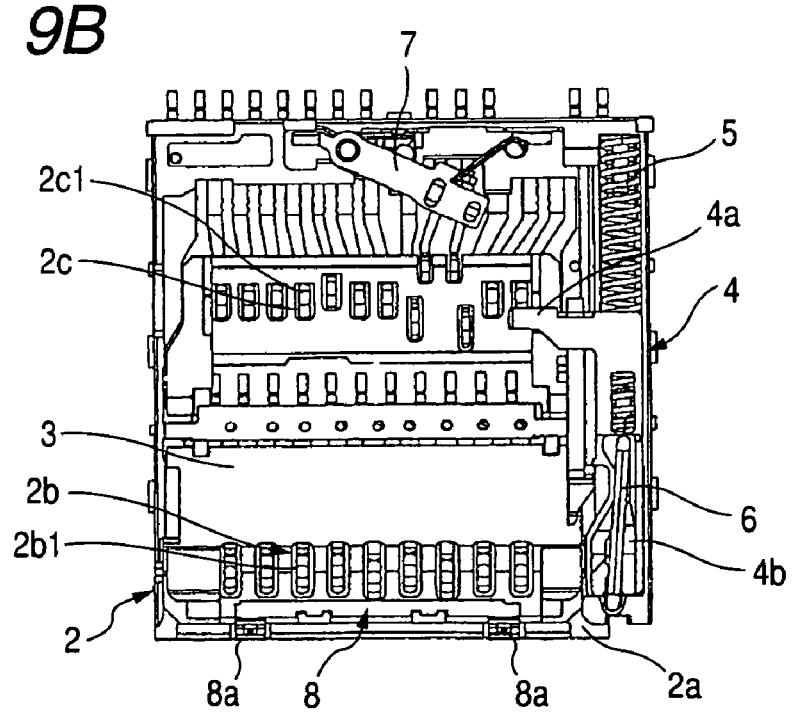

FIGS. 8A and 8B are views showing the state of this embodiment when a card is over-stroked during ejection, FIG. 8A is a plan view, and FIG. 8B is a plan view when the card is removed from FIG. 8A, and FIGS. 9A and 9B are views showing the state of this embodiment when a card is ejected, FIG. 9A is a plan view, and FIG. 9B is a plan view when the card is removed from FIG. 9A.

When the card 1 held in the predetermined mounting position is ejected in this way, as shown in FIG. 8, the rear end 1a of the card 1 is pressed, thereby over-stroking the card 1. Thereby, the slider 4 slightly slides toward the deep side of the apparatus via the engaging portion 4a which engages the front end 1c of the card 1, and the pin of the slide member 6 is released from the locking portion 4b1 of the heart cam 4b. Additionally, the ejection lever 7 rotates counterclockwise more slightly.

When the pressing force given to the rear end 1a of the card 1 is released from this state, the slider 4 slides in the direction of the insertion slot 2a by the force of the coil spring 5. Further, the ejection lever 7 rotates clockwise by the biasing force by a spring, and thereby, the card 1 is ejected as shown in FIG. 9. Accordingly, the separate card 1 can be pulled out of the card connector according to this embodiment with the rear end 1a of the card 1 gripped.

As mentioned above, while the card 1 reaches the ejected state shown in FIG. 9 from the over-stroked state shown in FIG. 8, the engaging protrusions (not shown) of the top face of the driving member 3 are separated from the notches (not shown) of the bottom face of the card 1, the driving member 3 pressed via the engaging protrusions rotates downward, and depresses the first terminal members 2b to the non-contact position where the first terminal members 2b are separated from the bottom face of the card 1 and do not contact the second external connections 1d of the card 1. Additionally, when the card 1 is extracted, the driving member 3 rotates upward by the resilient force of the biasing members 9, and the card connector according to this embodiment returns to a standby state.

Although the driving member 3 of this embodiment has been described as one having engaging protrusions (not shown), it may not have the engaging protrusions. In this case, with the insertion of the card 1, the grounding portion 8 contacts the bottom face of the card 1 whereby the driving member 3 is depressed and thereby, the first terminal members 2b are depressed. When the card 1 is inserted to the predetermined mounting position, the bottom face of the card 1 and the contacts 2b1 of the first terminal members 2b move in a state where they contact each other. In a case where the driving member 3 does not have the engaging protrusions as such, the tips of the first terminal members 2b and the card 1 contact each other by the depression of the first terminal members 2b by the driving member 3. As a result, damage, such as buckling, of the first terminal members 2b, can be prevented.

EFFECTS OF THIS EMBODIMENT

In a case where static the card 1 are charged with static electricity or the like when the card 1 is inserted from the insertion slot 2a of the housing 2, the card 1 contacts the grounding portion 8 integrally provided with the driving member 3 before it contacts the first terminal members 2b, and electricity is discharged via the grounding portion 8. That is, even if the card 1 is charged with unnecessary static electricity or the like when the card 1 is inserted, discharge to the first terminal members 2b can be prevented. Thereby, the first terminal members 2b or electrical components connected to the first terminal members can be prevented from being damaged due to charging of the inserted card 1, and a highly reliable card connector can be realized.

Additionally, since the biasing members 9 which bias the driving member 3, and the grounding portion 8 are provided integrally, and the biasing members 9 and the grounding portion 8 are electrically connected together, a path which makes the grounding portion 8 grounded to the biasing members 9 can be shared, and the number of parts can be reduced. This makes it possible to hold down production cost.

Additionally, since the biasing members 9 and the grounding terminals 2b2 of the first terminal members 2b are provided such that they contact each other, and the biasing members 9 and the first terminal members 2b are electrically connected together, discharge paths can be basically simplified into one path, and the configuration of the discharge path can be simplified.

Additionally, the grounding external connection 1e which can contact the projections 8a of the grounding portion 8 is provided on the bottom face of the card 1. Therefore, when the card 1 is inserted and mounted in a predetermined mounting position, the card 1 is ground-contacted via the grounding external connection 1e. Thus, the electric potential of an electric circuit in the card 1 can be stabilized. This also makes it possible to realize a highly reliable card connector.

It should be understood by those skilled in the art that various modifications, combinations, sub-combinations and alternations may occur depending on design requirements and other factors insofar as they are within the scope of the appended claims of the equivalents thereof.

What is claimed is:

1. A card connector comprising:
   a housing which allows a card to inserted thereinto, and
   a plurality of terminal members which is arranged in the housing, and is respectively connectable to a plurality of external connections provided on the bottom face of the card,
   wherein the plurality of terminal members is composed of first terminal members which are arranged on an inner bottom face of the housing, are provided side to side along an insertion direction of the card, and are connectable to first external connections of the plurality of external connections of the card which are provided on the side of a rear end of the card, and second terminal members which are connectable to second external connections of the plurality of external connections of the card which are provided on the side of a front end of the card,
   a driving member which is able to displace the first terminal members located nearer to an insertion slot of the card when the card is inserted in a direction apart from the second external connections of the card is provided on the inner bottom face of the housing,
   wherein the driving member is provided with a grounding portion which is located nearer to the insertion slot of the card than the first terminal members.

2. The card connector according to claim 1, further comprising biasing members which biases the driving member in a direction in which the driving member abuts on the card, wherein the biasing members and the grounding portion are electrically connected together.

3. The card connector according to claim 2,
   wherein the biasing members and the grounding terminals of the first terminal members are electrically connected together.

4. The card connector according to claim 1,
   wherein a grounding external connection which is connectable to the grounding portion is provided on the bottom face of the card.

5. The card connector according to claim 2,
   wherein a grounding external connection which is connectable to the grounding portion is provided on the bottom face of the card.

6. The card connector according to claim 3,
   wherein a grounding external connection which is connectable to the grounding portion is provided on the bottom face of the card.

* * * * *